United States Patent
Robb et al.

(10) Patent No.: US 6,883,967 B2
(45) Date of Patent: Apr. 26, 2005

(54) CENTER BEARING ASSEMBLY INCLUDING A SUPPORT MEMBER CONTAINING A RHEOLOGICAL FLUID

(75) Inventors: Scott B. Robb, Toledo, OH (US); James A. Duggan, Temperance, MI (US)

(73) Assignee: Torque-Traction Technologies, Inc., Holland, OH (US)

(*) Notice: Subject to any disclaimer, the term of this patent is extended or adjusted under 35 U.S.C. 154(b) by 66 days.

(21) Appl. No.: 10/407,917

(22) Filed: Apr. 4, 2003

(65) Prior Publication Data

US 2003/0202726 A1 Oct. 30, 2003

Related U.S. Application Data

(60) Provisional application No. 60/370,057, filed on Apr. 4, 2002.

(51) Int. Cl.[7] ............................. F16C 27/06; B60K 5/12
(52) U.S. Cl. .................... 384/536; 384/99; 267/140.12
(58) Field of Search ........................ 384/99, 535, 536, 384/581, 582; 267/140.12, 140.15; 188/267.2

(56) References Cited

U.S. PATENT DOCUMENTS

| | | |
|---|---|---|
| 2,557,140 A | 6/1951 | Razdowitz |
| 2,635,483 A | 4/1953 | Welsh |
| 2,673,631 A | 3/1954 | Gold |
| 2,732,921 A | 1/1956 | Rabinow |
| 2,809,733 A | 10/1957 | Perry |
| 2,987,153 A | 6/1961 | Perry |
| 3,144,921 A | 8/1964 | Martinek |
| 3,538,469 A | 11/1970 | Litte et al. |
| 4,200,003 A | 4/1980 | Miller |
| 4,392,694 A | 7/1983 | Reynolds |
| 4,772,407 A | 9/1988 | Carlson |
| 4,782,927 A | 11/1988 | Sproston et al. |
| 4,849,120 A | 7/1989 | Price et al. |
| 4,867,655 A | 9/1989 | Barbic et al. |
| 4,896,754 A | 1/1990 | Carlson et al. |
| 4,909,489 A * | 3/1990 | Doi ........................ 267/140.12 |
| 4,921,229 A | 5/1990 | Hori |
| 5,007,303 A | 4/1991 | Okuzumi |
| 5,054,593 A | 10/1991 | Carlson |
| 5,076,403 A * | 12/1991 | Mitsui ..................... 188/267.1 |
| 5,090,531 A | 2/1992 | Carlson |
| 5,236,182 A | 8/1993 | Aoki et al. |

(Continued)

FOREIGN PATENT DOCUMENTS

| | | |
|---|---|---|
| DE | 40 08 538 | 9/1990 |
| EP | 342882 | 11/1989 |
| EP | 866232 | 9/1998 |

*Primary Examiner*—Thomas R. Hannon
(74) *Attorney, Agent, or Firm*—MacMillan, Sobanski & Todd, LLC

(57) ABSTRACT

A center bearing assembly rotatably supports an intermediate portion of a vehicle driveshaft assembly during use. The center bearing assembly includes a rigid bracket that is secured to a support surface of the vehicle, a support member that is supported within the rigid bracket, and an annular bearing that is supported within the support member for rotatably supporting the intermediate portion of the vehicle driveshaft assembly. The support member is formed from a resilient material and has a cavity formed therein. A plurality of bladders is disposed within the cavity formed in the support member. Each of the bladders is filled with a quantity of a rheological fluid. Fluid communication between adjacent pairs of the bladders is provided by respective control valves. A control circuit is provided for selectively generating and applying an energy field to each of the control valves so as to vary the ability of the rheological fluid to flow therethrough between the associated pair of bladders. As a result, the vibration dampening characteristics of the support member can be varied.

36 Claims, 6 Drawing Sheets

U.S. PATENT DOCUMENTS

| | | |
|---|---|---|
| 5,322,484 A | 6/1994 | Reuter |
| 5,380,100 A | 1/1995 | Yu |
| 5,452,957 A | 9/1995 | Duggan |
| 5,501,531 A * | 3/1996 | Hamaekers ................ 384/536 |
| 5,730,531 A | 3/1998 | Pinkos et al. |
| 5,797,469 A | 8/1998 | Gerigk |
| 5,902,048 A | 5/1999 | Duggan |
| RE36,270 E | 8/1999 | Duggan |

* cited by examiner

CENTER BEARING ASSEMBLY INCLUDING A SUPPORT MEMBER CONTAINING A RHEOLOGICAL FLUID

CROSS REFERENCE TO RELATED APPLICATION

This application claims the benefit of U.S. Provisional Application Ser. No. 60/370,057, filed Apr. 4, 2002, the disclosure of which is incorporated herein by reference.

BACKGROUND OF THE INVENTION

This invention relates in general to bearings for supporting shafts for rotation. In particular, this invention relates to an improved structure for a center bearing assembly for rotatably supporting an intermediate portion of a vehicle driveshaft assembly.

In most land vehicles in use today, a drive train system is provided for transmitting rotational power from an output shaft of an engine/transmission assembly to an input shaft of an axle assembly so as to rotatably drive one or more wheels of the vehicle. To accomplish this, a typical vehicular drive train system includes a driveshaft assembly having first and second end fittings (such as tube yokes) that are secured to the opposed ends thereof. The first end fitting forms a portion of a first universal joint, which provides a rotatable driving connection from the output shaft of the engine/transmission assembly to the first end of the driveshaft assembly while accommodating a limited amount of angular misalignment between the rotational axes thereof. Similarly, the second end fitting forms a portion of a second universal joint, which provides a rotatable driving connection from the second end of the driveshaft assembly to the input shaft of the axle assembly while accommodating a limited amount of angular misalignment between the rotational axes thereof.

In some vehicles, the distance separating the engine/transmission assembly and the axle assembly is relatively short. For these vehicles, the driveshaft assembly can be formed from a single, relatively long driveshaft tube having the first and second end fittings secured to the ends thereof. In other vehicles, however, the distance separating the engine/transmission assembly and the axle assembly is relatively long, making the use of a single driveshaft tube impractical. For these vehicles, the driveshaft assembly can be formed from a plurality (typically two) of separate, relatively short driveshaft sections. In a compound driveshaft assembly such as this, a first end of the first driveshaft section is connected to the output shaft of the engine/transmission assembly by a first universal joint, a second end of the first driveshaft section is connected to a first end of the second driveshaft section by a second universal joint, and a second end of the second driveshaft section is connected to the input shaft of the axle assembly by a third universal joint.

A compound driveshaft assembly that is composed of two or more separate driveshaft sections usually requires the use of a structure for supporting the intermediate portions thereof for rotation during use. A typical intermediate support structure for a driveshaft assembly (which is typically referred to as a center bearing assembly) includes an annular bearing having an inner race that engages one of the driveshaft sections and an outer race that supports the inner race for rotation relative thereto. The outer race of the annular bearing is supported within a generally annular support member that is usually formed from a relatively resilient material, such as rubber. The resilient support member is, in turn, supported within a rigid bracket that is secured to a support surface provided on the vehicle. Thus, the center bearing assembly functions to support the intermediate portion of the driveshaft assembly for rotation during use. Many center bearing assembly structures of this general type are known in the art.

As is well known, the engine/transmission assembly of a typical vehicular drive train system generates a variety of torsional and other relatively high frequency vibrations in the driveshaft assembly as it is rotated during use. Such driveshaft assembly vibrations often result in the generation of noise that can undesirably be transmitted into the vehicle. The resilient support member is provided in the center bearing assembly to absorb at least some of such vibrations so as to reduce the amount of noise that is transmitted from the driveshaft assembly to the vehicle frame. To accomplish this, the resilient support member is usually formed from an elastomeric material, such as rubber, having a resonant frequency that is approximately the same as the frequency of the vibrations that are generated in the driveshaft assembly. When the resonant frequency of the resilient support member is approximately the same as the frequency of the noise and other vibrations in the driveshaft assembly, then such noise and other vibrations will be substantially absorbed by the resilient support member and will not transmitted to the vehicle frame during use.

However, it has been found that the resonant frequency of the resilient support member may not always be approximately the same as the frequency of the noise and other vibrations in the driveshaft assembly. For example, it has been found that changes in the ambient temperature of the resilient support member can cause the resonant frequency thereof to vary. However, the torsional and other relatively high frequency vibrations that are generated by the engine and the transmission in the driveshaft assembly as it is rotated during use remain relatively constant. If the resonant frequency of the resilient support member is not approximately the same as the frequency of the noise and other vibrations in the driveshaft assembly, then the ability of the resilient support member to absorb such noise and other vibrations will be adversely affected. Thus, it would be desirable to provide a resilient support member for a center bearing assembly having a resonant frequency that can be adjusted in accordance with changes in the operating conditions of the vehicle such that the resonant frequency of the resilient support member is always approximately the same as the frequency of the noise and other vibrations in the driveshaft assembly. Therefore, noise and other vibrations will be substantially absorbed by the resilient support member and will not transmitted to the vehicle frame during use.

SUMMARY OF THE INVENTION

This invention relates to an improved structure for a center bearing assembly for rotatably supporting an intermediate portion of a vehicle driveshaft assembly during use. The center bearing assembly includes a rigid bracket that is secured to a support surface of the vehicle, a support member that is supported within the rigid bracket, and an annular bearing that is supported within the support member for rotatably supporting the intermediate portion of the vehicle driveshaft assembly. The support member is formed from a resilient material and has a cavity formed therein. A plurality of bladders is disposed within the cavity formed in the support member. Each of the bladders is filled with a quantity of a rheological fluid. Fluid communication between adjacent pairs of the bladders is provided by respective control valves. A control circuit is provided for selectively generating and applying an energy field to each of the control valves so as to vary the ability of the rheological fluid to flow therethrough between the associated pair of bladders. As a result, the vibration dampening characteristics of the support member can be varied.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
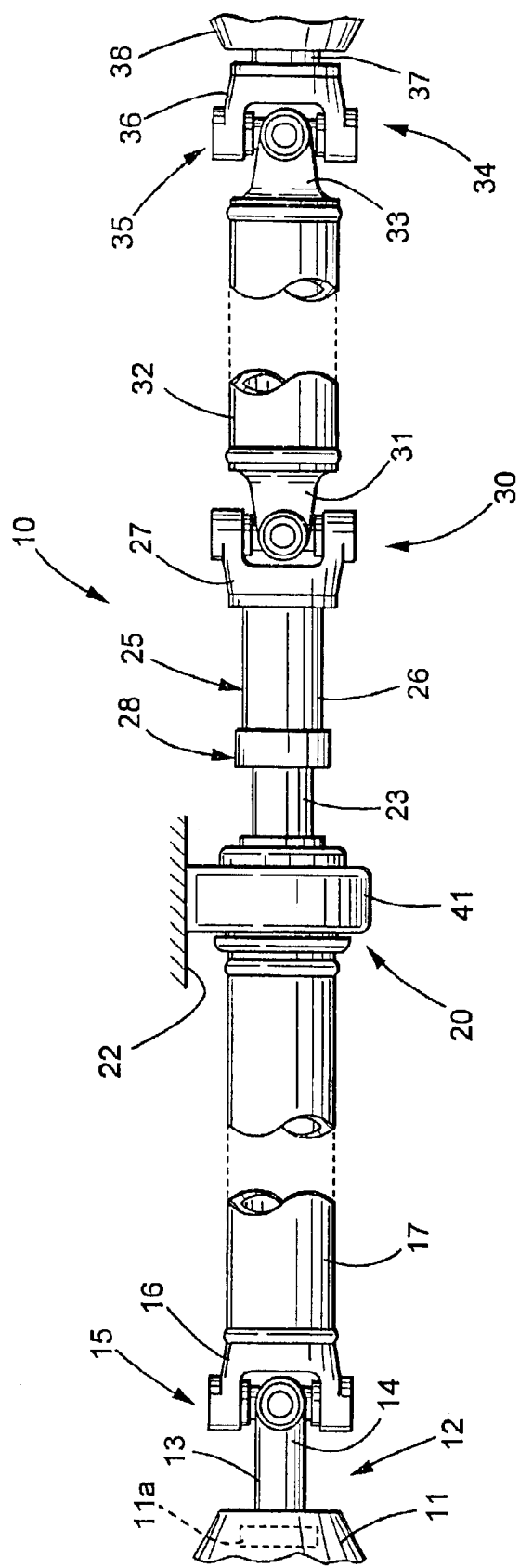
FIG. 1 is a side elevational view of a drive train system for a vehicle including a center bearing assembly in accordance with this invention.

Referring now to the drawings, there is illustrated in FIG. 1 a drive train system, indicated generally at 10, for a vehicle that is adapted to transmit rotational power from an engine/transmission assembly 11 to a plurality of driven wheels (not shown). The illustrated drive train system 10 is intended merely to illustrate one environment in which this invention may be used. Thus, the scope of this invention is not intended to be limited for use with the specific structure for the vehicle drive train system 10 illustrated in FIG. 1 or, for that matter, to vehicle drive train systems in general. On the contrary, as will become apparent below, this invention may be used to support any desired component for rotation.

The engine/transmission assembly 11 is conventional in the art and includes an externally splined output shaft (not shown) that is connected to a first slip yoke, indicated generally at 12. The first slip yoke 12 is conventional in the art and includes an end portion 13 having a smooth cylindrical outer surface and an internally splined inner surface. The internally splined inner surface of the end portion 13 of the first slip yoke 12 engages the externally splined output shaft of the engine/transmission assembly 11 in a known manner. As a result, the first slip yoke 12 is rotatably driven by the output shaft of the engine/transmission assembly 11, but is free to move axially relative thereto to a limited extent.

An annular seal 11a may be provided within or adjacent to the end of the engine/transmission assembly 11. The end portion 13 of the first slip yoke 12 extends through the annular seal 11a. In a known manner, the seal 11a engages and seals against the smooth outer cylindrical surface of the end portion 13 of the first slip yoke 12 to prevent dirt, water, and other contaminants from entering into the engine/transmission assembly 11. The seal 11a is conventional in the art and can be formed having any desired structure. To insure a reliable seal, however, it is usually important for the outer cylindrical surface of the end portion 13 of the first slip yoke 12 to be generally smooth and free from relatively large surface irregularities, such as nicks and dents. If desired, the seal 11a may be retained in an annular ridge (not shown) formed in the engine/transmission assembly 11.

The first slip yoke 12 further includes a yoke portion 14 that forms one part of a first universal joint assembly, indicated generally at 15. The first universal joint assembly 15 is also conventional in the art and includes a tube yoke 16 that is connected to the yoke portion 14 of the first slip yoke 12 by a cross in a known manner. The tube yoke 16 is secured, such as by welding, to a first end of a first driveshaft section 17 for rotation therewith. The first universal joint assembly 15 thus provides a rotational driving connection between the output shaft of the engine/transmission assembly 11 and the first driveshaft section 17, while permitting a limited amount of axial misalignment therebetween.

The first driveshaft section 17 extends through and is supported for rotation by a center bearing assembly, indicated generally at 20. The structure of the center bearing assembly 20 will be explained in detail below. The center bearing assembly 20 is secured to a support surface 22, such as a portion of a frame, chassis, or body of the vehicle. The first driveshaft section 17 has a second end 23 that, in the illustrated embodiment, is reduced in diameter relative to the first end of the first driveshaft section 17, although such is not necessary. The reduced diameter end 23 can be formed as a separate structure that is welded onto the larger diameter first end of the first drive shaft section 17. In any event, a portion of the outer surface of the reduced diameter second end 23 of the first driveshaft section 17 is formed having a plurality of external splines (not shown).

A second slip yoke, indicated generally at 25, is connected, such as by welding, to the reduced diameter second end 23 of the first driveshaft section 17 for rotation therewith. The second slip yoke 25 is conventional in the art and includes an end portion 26 having an internally splined inner surface (not shown). The internally splined inner surface of the end portion 26 of the second slip yoke 25 engages the externally splined portion of the second end 23 of the first driveshaft section 17 in a known manner. As a result, the second slip yoke 25 is rotatably driven by the first driveshaft section 17, but is free to move axially relative thereto to a limited extent.

An annular seal, indicated generally at 28, may be mounted on the end portion 26 of the second slip yoke 25. The reduced diameter second end 23 of the first driveshaft section 17 extends through the annular seal 28. In a known manner, the annular seal 28 engages and seals against the smooth outer cylindrical surface of the reduced diameter second end 23 of the first driveshaft section 17 to prevent dirt, water, and other contaminants from entering into the region of the cooperating splines. The seal 28 is conventional in the art and can be formed having any desired structure.

The second slip yoke 25 further includes a yoke portion 27 that forms one part of a second universal joint assembly, indicated generally at 30. The second universal joint assembly 30 is also conventional in the art and includes a tube yoke 31 that is connected to the yoke portion 27 of the second slip yoke 25 by a cross in a known manner. The tube yoke 31 is secured, such as by welding, to a first end of a second driveshaft section 32 for rotation therewith. The second universal joint assembly 30 thus provides a rotational driving connection between the second end 23 of the first driveshaft section 17 and the first end of the second driveshaft section 32, while permitting a limited amount of axial misalignment therebetween.

The second end of the second driveshaft section 32 is secured, such as by welding to a tube yoke 33 that forms one part of a third universal joint assembly, indicated generally at 34. The third universal joint assembly 34 is also conventional in the art and includes a third slip yoke, indicated generally at 35. The third slip yoke 35 is conventional in the art and includes a yoke portion 36 that is connected to the tube yoke 33 by a cross in a known manner. The third slip yoke 35 further includes an end portion 37 having a smooth cylindrical outer surface and an internally splined inner surface (not shown). The internally splined inner surface of the end portion 37 of the third slip yoke 12 engages an externally splined input shaft (not shown) of a conventional axle assembly 38 that is connected to the plurality of driven wheels of the vehicle in a known manner. As a result, the input shaft of the axle assembly 38 is rotatably driven by the second driveshaft section 32, but is free to move axially relative thereto to a limited extent.

An annular seal (not shown) may be provided within or adjacent to the end of the axle assembly 38. The annular seal may be similar in structure and operation to the annular seal 11a described above. The end portion 37 of the third slip yoke 35 extends through the annular seal. In a known manner, the annular seal engages and seals against the smooth outer cylindrical surface of the end portion 37 of the third slip yoke 35 to prevent dirt, water, and other contaminants from entering into the axle assembly 38. The seal is conventional in the art and can be formed having any desired structure. To insure a reliable seal, however, it is usually important for the outer cylindrical surface of the end portion 37 of the third slip yoke 35 to be generally smooth and free from relatively large surface irregularities, such as nicks and dents. If desired, the seal may be retained in an annular ridge (not shown) formed in the axle assembly 38.

Figure 2:
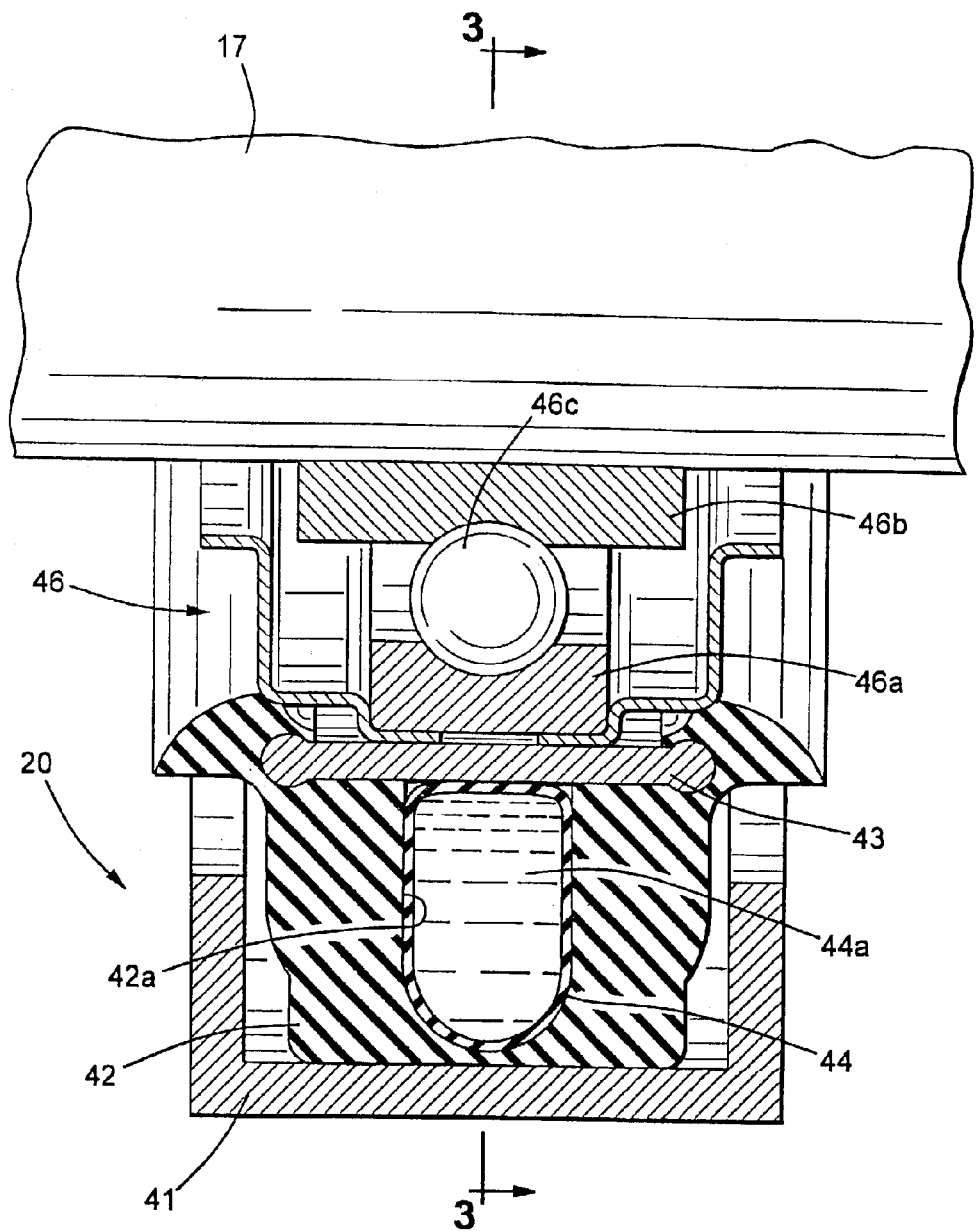
FIG. 2 is an enlarged sectional elevational view of a portion of a first embodiment of the center bearing assembly illustrated in FIG. 1.
Figure 3:
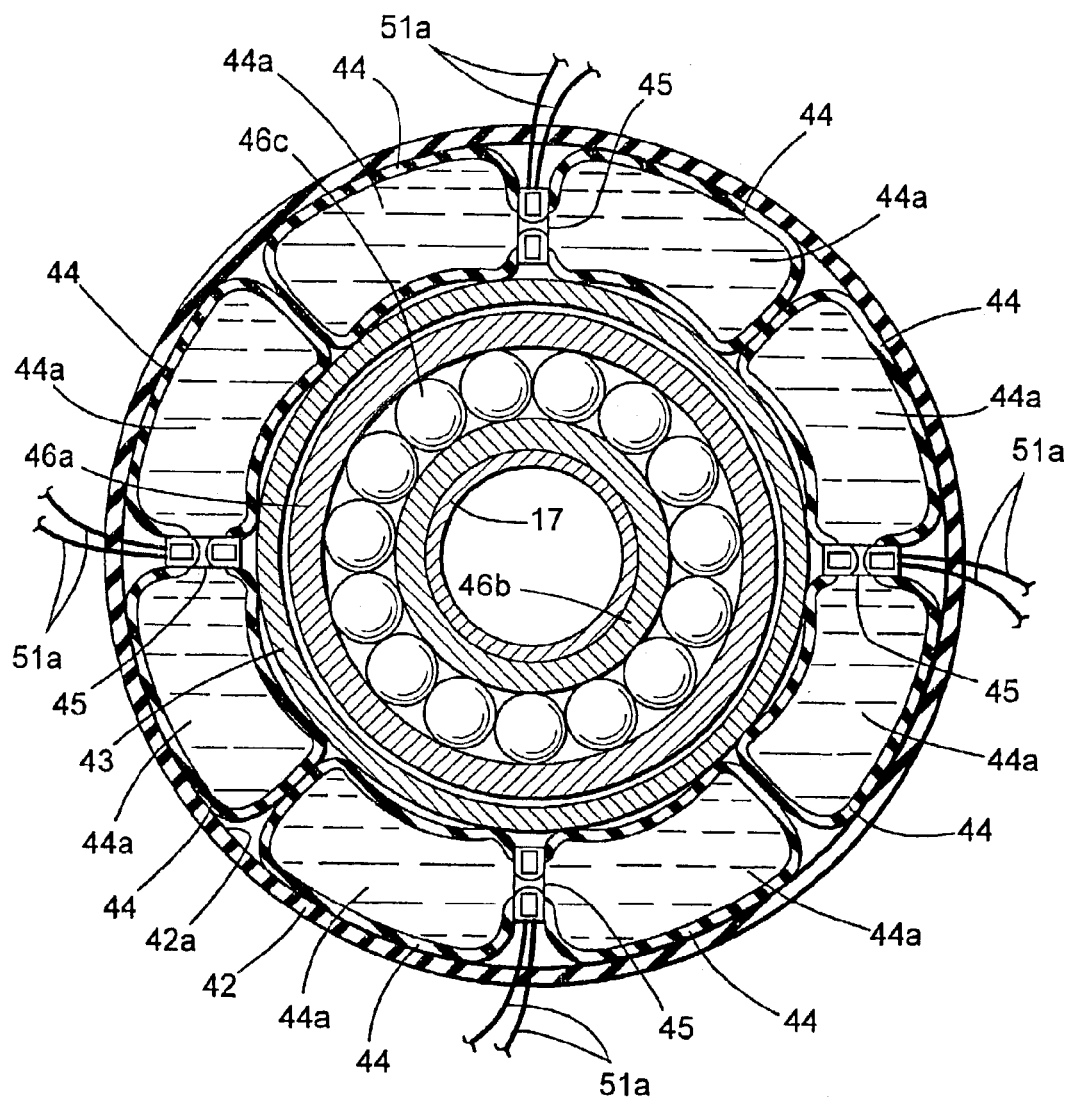
FIG. 3 is a sectional elevational view of the first embodiment of the center bearing assembly taken along line 3—3 of FIG. 2, wherein the bracket and the electromagnetic coil have been omitted for clarity.

Referring now to FIGS. 2 and 3, the structure of the center bearing assembly 20 is illustrated in detail. As shown therein, the center bearing assembly 20 includes a rigid bracket or frame 41 that is secured to the support surface 22 of the vehicle. Typically, the bracket 41 has a generally U-shaped body portion having respective flange portions (not shown) extending outwardly from the ends thereof. Threaded fasteners (not shown) can extend through respective apertures formed through the flange portions to secure the bracket 41 to the support surface 22 of the vehicle. If desired, the body portion of the bracket 41 can be formed having a generally U-shaped cross sectional shape, as shown in FIG. 2, to increase the strength and rigidity thereof.

The center bearing assembly 20 also includes a first embodiment of a supporting structure that is supported within the rigid bracket 41. In this embodiment of the invention, the supporting structure is a support member 42 that is generally annular in shape and is preferably formed from a resilient material, such as a conventional elastomeric material (rubber, for example) of the type that is typically used in conventional center bearing assemblies. The support member 42 has a cavity 42a formed therein that, in the illustrated embodiment, is a generally annular recess that extends circumferentially about the inner portion of the support member 42. However, the cavity 42a may be formed having any desired shape and may, if desired, be formed completely enclosed within the support member 42. If desired, the support member 42 can have a rigid support ring 43 secured thereto. In the illustrated embodiment, the support ring 43 is formed from an annular band of a metallic material and is molded to an inner portion of the support member 42. However, the support ring 43 can be formed having any desired shape and can be formed from any desired material.

The center bearing assembly 20 further includes a plurality of bladders, each indicated at 44, that is disposed within the cavity 42a formed in the support member 42. In the illustrated embodiment, the eight of such bladders 44 are disposed within the cavity 42a in a circumferential array thereabout. However, it will be appreciated that any number of such bladders 44 may be provided at any desired locations, and further that such bladders 44 need not extend completely throughout the cavity 42a. Furthermore, in a manner that is described further below, it will be appreciated that a single continuous bladder 44 may be provided in lieu of the plurality of bladders 44 shown in FIG. 3. The bladders 44 may be formed from any material that is capable of containing a quantity of a fluid 44a therein, for a purpose that will be explained in greater detail below. Preferably, however, the bladders 44 are formed from a relatively resilient material that allows the size and shape thereof to be varied.

Fluid communication between the bladders 44 is provided by respective control valves 45. As shown in FIG. 3, four control valves 45 provide fluid communication between adjacent pairs of the eight bladders 44. However, it will be appreciated that the control valves 45 can be arranged to provide fluid communication between any desired ones of the bladders 44. Furthermore, if a single continuous bladder is provided in lieu of the plurality of bladders 44 as mentioned above, then one or more of the control valves 45 can be used to provide fluid communication between interior portions of the single continuous bladder.

The control valves 45 are provided to vary the ability of the fluid 44a to flow therethrough between the associated pair of bladders 44. As a result, the vibration dampening characteristics of the support member 42 can be varied. For example, if all of the control valves 45 are closed, then no fluid communication is permitted between the associated pairs of bladders 44. As a result, the overall resiliency of the support member 42 will be relatively small. However, if all of the control valves 45 are opened, then fluid communication is permitted between each of the associated pairs of bladders 44. As a result, the overall resiliency of the support member 42 will be relatively large. It may be desirable to close some of the control valves 45 and open the others so as to adjust the overall resiliency of the support member 42. Thus, by controlling the opening and closing of the control valves 45, the overall resiliency of the support member 42 can be varied as desired.

Lastly, the center bearing assembly 20 includes an annular bearing, indicated generally at 46, for rotatably supporting the first driveshaft section 17 thereon. The annular bearing 46 includes an outer race 46a that is supported on the support ring 43, an inner race 46b that engages the first driveshaft section 17, and a plurality of balls 46c disposed between the outer race 46a and the inner race 46b so that the inner race 46b is supported for rotation relative to the outer race 46a. Thus, the first driveshaft section 17 is supported for rotation by the center bearing assembly 20.

As mentioned above, the bladders 44 may be formed from any material that is capable of containing a quantity of a fluid 44a therein. In the preferred embodiment, each of the bladders 44 contains a quantity of a rheological fluid. As used herein, the term "rheological fluid" refers to a fluid that exhibits a change in its ability to flow or shear in the presence or upon the application of an appropriate energy field. In the preferred embodiment, the rheological fluid is a magneto-rheological (MR) fluid that is responsive to the presence of a magnetic field for changing its ability to flow or shear. MR fluids are formed of magnetizable particles, such as carbonyl iron, in a fluid carrier, such as a silicone oil. When exposed to a magnetic field, the particles align and reduce the ability of the fluid to flow. The shear resistance of the MR fluid is a function of the magnitude of the applied magnetic field. MR fluids are preferred for use in this invention because they are capable of generating relatively high fluid shear stresses and can be controlled using power supplies that are normally available in vehicles. TRW MR fluid, which is commercially available from TRW, Inc., is an example of one known rheological fluid that has been found suitable for use in this invention. However, other rheological fluids can also be used in accordance with this invention. For example, electro-rheological (ER) fluids that are responsive to the presence of electrical energy (such as voltage or current) may also be used.

Figure 4:
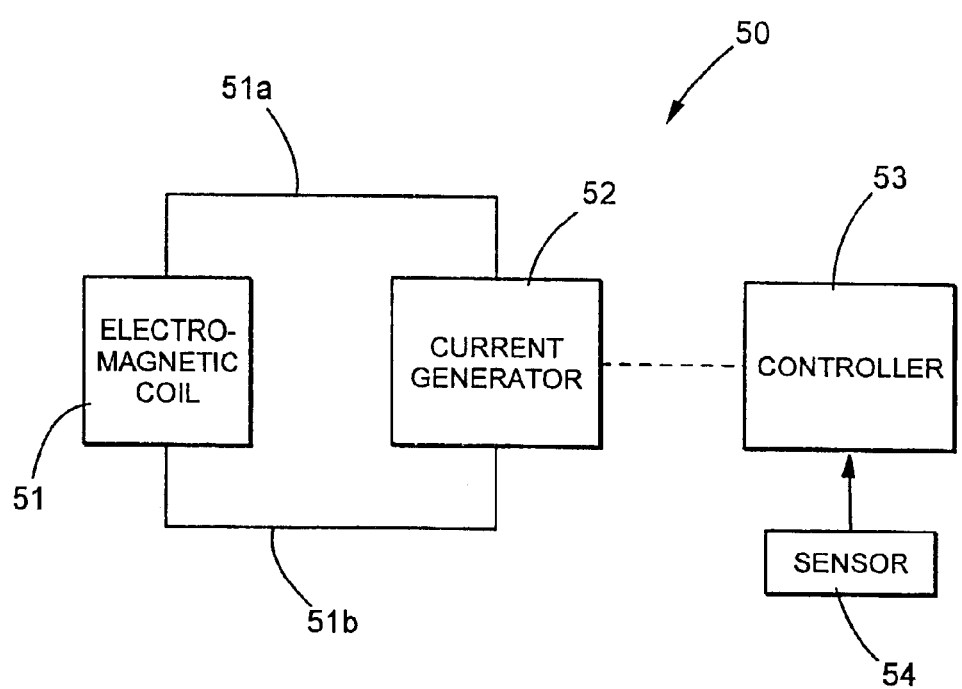
FIG. 4 is a block diagram of a control system for the first embodiment of the center bearing assembly illustrated in FIGS. 1 through 3.

A control circuit, indicated generally at 50 in FIG. 4, is provided for selectively generating and applying an energy field within or about one or more of the control valves 45 to vary the ability of the fluid 44a to flow therethrough between the associated pairs of the bladders 45. The specific nature of the control circuit 50 will depend upon the particular type of rheological fluid that is selected for use. In the preferred embodiment, where the rheological fluid is an MR fluid, the control circuit includes one or more electromagnetic coils 51 that are provided within each of the control valves 45. Each of electromagnetic coils 51 is conventional in the art and is composed of a winding of an electrical conductor having leads 51a and 51b that extend therefrom through to a source of electrical power, such as an electrical current generator 52. In a manner that is known in the art, when a closed electrical circuit is established through the leads 51a and 51b between the electromagnetic coil 51 and the source of current controller 52, electrical current flows through the coil 51. As a result, a magnetic field is generated by the electromagnetic coil 51.

The electromagnetic coils 51 may be arranged in any manner such that when energized, a magnetic field is applied within or about the associated control valve 45. By varying the magnitude of the electrical current that is supplied to the electromagnetic coil 51, the strength of the magnetic field that is applied within or about the associated control valve 45 can be varied. As a result, the ability of the fluid 44a to flow through the control valve 45 between the associated pair of bladders 44 can be varied. The control valve 45 can be operated in a totally closed mode (wherein fluid 44a is prevented from flowing through the control valve 45 between the associated pair of bladders 44), a totally opened mode (wherein fluid 44a is permitted to flow unrestricted through the control valve 45 between the associated pair of bladders 44), and a restricted mode (wherein fluid 44a is permitted to flow through the control valve 45 between the associated pair of bladders 44 at a restricted rate). To accomplish this, the control circuit 50 also includes a controller 53 that controls the operation of the current controller 52. The controller 53 is conventional in the art and may be embodied as any microprocessor or other programmable controller that is responsive to a signal from one or more sensors 54 for controlling the operation of the current generator 52. The sensor 54 is also conventional in the art and is adapted to generate an electrical signal that is representative of an operating condition of the vehicle. For example, some of the vehicle operating conditions that can be monitored by the sensor 54 can include ambient temperature, vehicle speed, vehicle acceleration, rotational speed of the first driveshaft section 17, angular displacement of the first driveshaft section 17, radial acceleration of the center bearing assembly 20, axial acceleration of the center bearing assembly 20, radial displacement of the center bearing assembly 20, and axial displacement of the center bearing assembly 20. However, any operating condition or group of conditions of the vehicle may be sensed and used to control the vibration dampening characteristics of the support member 30.

The controller 53 is programmed to periodically or continuously read the electrical signals from the sensor 54 and to generate one or more electrical control signal in response to a pre-programmed algorithm. The algorithm that is used by the controller 53 can be easily derived using known vibration data or by testing on the vehicle. For example, by measuring the amount of vibration that is generated for given value of the sensed operating condition, a look-up table can be created that correlates the value of the sensed operating condition with a value for the control signal that will minimize the generation of such vibration. The same procedure can be followed when two or more operating conditions are sensed. The current generator 52 is also conventional in the art and is responsive to the output signal from the controller 53 for generating a corresponding electrical current to some or all of the coils 51, which generate respective magnetic fields in response thereto. Thus, it can be seen that the magnitude of the output signal generated by the controller 53 determines the magnitudes of the electromagnetic fields generated by the electromagnetic coils 51 and, thus, varies the ability of the fluid 44a to flow through each of the control valves 45 between the associated pairs of bladders 44. The vibration dampening characteristics of the support member 42 can, therefore, be continuously varied according to the control algorithm and the information provided by the sensor 54.

Figure 5:
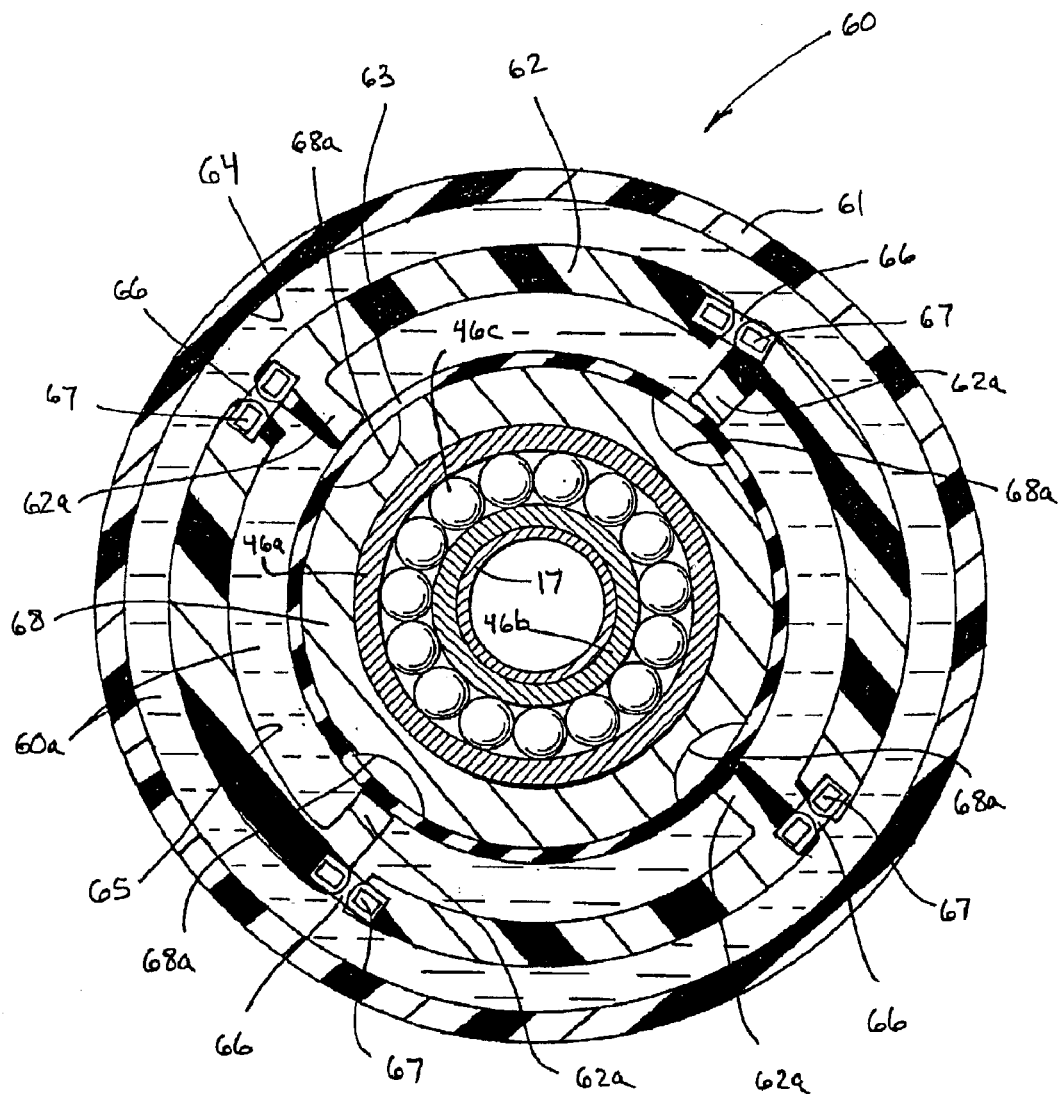
FIG. 5 is an enlarged sectional elevational view, similar to FIG. 3, of a portion of a second embodiment of the center bearing assembly illustrated in FIG. 1, wherein the bracket and the electromagnetic coil have been omitted for clarity.

FIG. 5 is an enlarged sectional elevational view, similar to FIG. 3, of a portion of a second embodiment of the center bearing assembly 20 illustrated in FIG. 1. In this second embodiment of the invention, the support member 42 and the plurality of bladders 44 have been replaced by a second embodiment of a supporting structure that includes a container, indicated generally at 60, for containing a quantity of the fluid 60a as described above. The fluid 60a may be an MR fluid, as described above. The container 60 includes an outer annular portion 61, an intermediate annular portion 62, and an inner annular portion 63. An outer annular chamber 64 is defined between the inner surface of the outer annular portion 61 and the outer surface of the intermediate annular portion 62. Similarly, an inner annular chamber 65 is defined between the inner surface of the intermediate annular portion 62 and the outer surface of the inner annular portion 63. The intermediate annular portion 62 has one or more legs 62a provided thereon that extend generally radially inwardly into engagement with the inner annular member 63. The legs 62a divide the inner annular chamber 65 into a plurality of discrete sub-chambers that preferably do not communicate directly with one another. The purpose for the legs 62a will be explained below.

The various portions 61, 62, and 63 of the container 60 may be formed from any desired material. Preferably, however, the outer annular portion 61 and the intermediate annular portion 62 are formed from rigid materials, such as hard urethane or metal, while the inner annular portion 63 is formed from a flexible material, such as an elastomeric or thin spring steel material. In the illustrated embodiment, the various portions 61, 62, and 63 of the container 60 are formed as separate pieces of material. However, the various portions 61, 62, and 63 of the container 60 may be formed from a single piece of material. Preferably, however, the outer annular portion 61 and the intermediate annular portion 62 are formed from a single piece of material, while the inner annular portion 63 is formed from a separate piece of material. The container 60 may be formed in any desired manner, such as by providing the portions 61, 62, and 63 in a generally cup-shaped configuration with an open axial face that is closed by an annular closure member (not shown).

A plurality of radially extending passageways 66 are formed through the intermediate annular portion 62 to provide fluid communication between the outer annular chamber 64 and the inner annular chamber 65. In the illustrated embodiment, four of such radially extending passageways 66 are formed through the intermediate annular portion 62. However, any desired number of such radially extending passageways 66 may be provided. In the illustrated embodiment, the legs 62a provided on the intermediate member 62 are disposed adjacent to the radially extending passageways, although such is not required. A control valve 67 is disposed in each of the radially extending passageways 66 to control the fluid communication between the outer annular chamber 64 and the inner annular chamber 65. The control valves 67 may be similar to the control valves 45 discussed above. The control valves 67 are connected to a control circuit (not shown), such as the control circuit 50 described above, for operation in a manner described in detail below.

The container 60 is supported on an annular support ring 68 that, in turn, is supported on the outer race 46a of the annular bearing 46. The annular support ring 68 is preferably formed from a rigid material, such as a metallic material. The annular support ring 68 has one or more recesses 68a formed in the outer surface thereof. Preferably, these recesses 68a correspond in number and are radially aligned with the radially innermost ends of the legs 62a provided on the intermediate portion 62 of the container 60, although such is not required. The purpose for such recesses 68a will be explained below.

Figure 6:
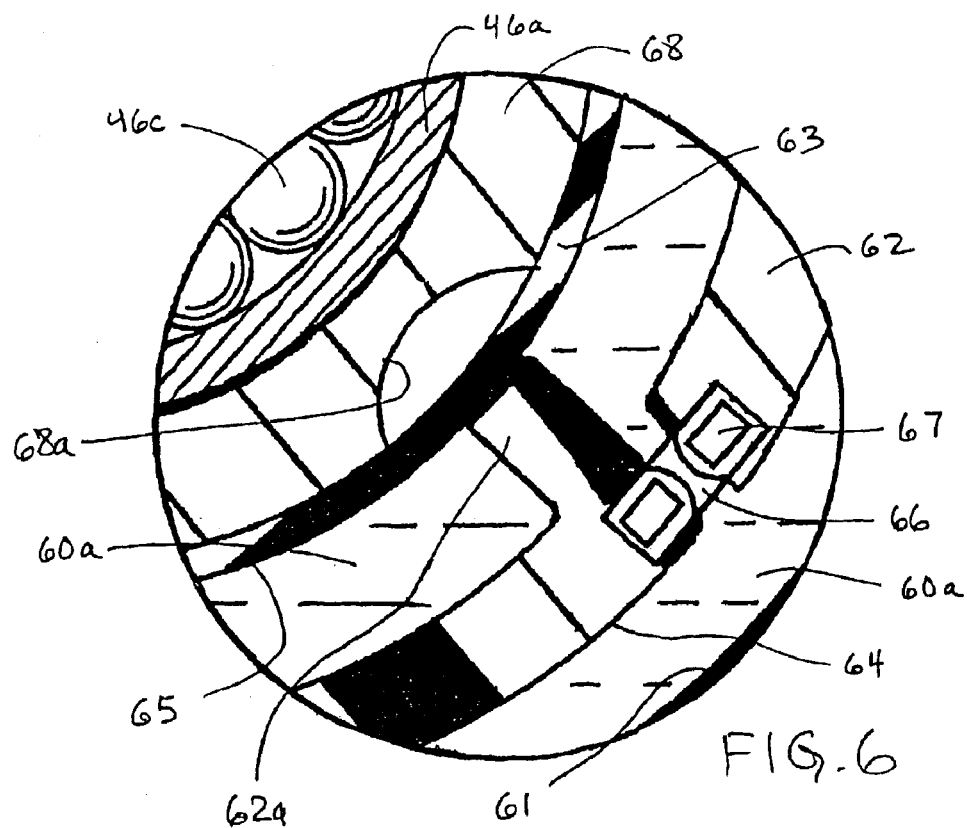
FIG. 6 is a further enlarged sectional elevational view of a portion of the second embodiment of the center bearing assembly illustrated in FIG. 5 showing some of the components thereof in a first operating condition.

When the drive train system 10 is operated in a first operating condition wherein only very small vibrations are generated in the first driveshaft section 17, then the annular bearing 46, and the annular support ring 68 are maintained in an essentially co-axially centered position relative to the container 60 and the remainder of the center bearing assembly 20, as best shown in FIG. 6. In this operating condition, the shapes of the outer annular chamber 64 and the inner annular chamber 65 are essentially constant, and virtually no fluid 60a passes through radially extending passageways 66 formed through the intermediate annular portion 62 between the outer annular chamber 64 and the inner annular chamber 65. The resilient nature of the inner annular portion 63 of the container 60 can function to absorb any relatively small vibrations that may occur in this operating condition.

Figure 7:
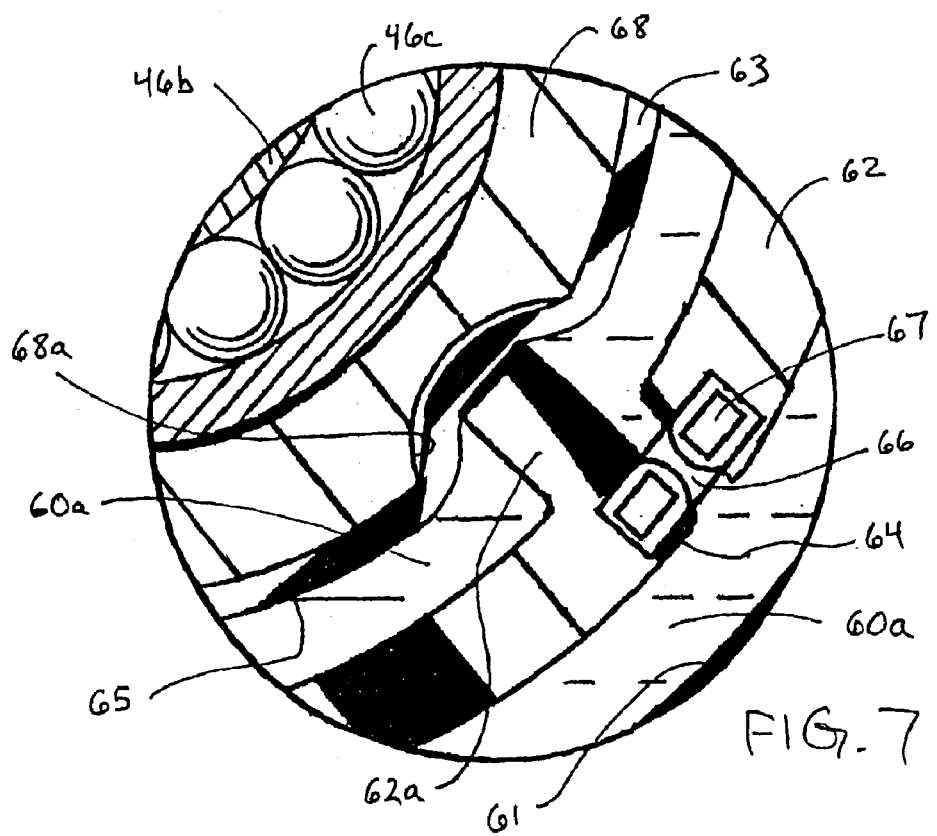
FIG. 7 is an enlarged sectional elevational view similar to FIG. 6 showing some of the components of the second embodiment of the center bearing assembly in a second operating condition.

However, when the drive train system 10 is operated in a second operating condition wherein more severe vibrations are generated in the first driveshaft section 17, then the annular bearing 46 and the annular support ring 68 will move relative to the container 60 and the remainder of the center bearing assembly 20. Such relative movement is permitted because the inner annular member 63 is capable of being deformed to a certain extent, allowing the recess 68a of the annular support ring 68 to move at least partially about the radially innermost end of the leg 62a provided on the intermediate annular member 62, as shown in FIG. 7. Such relative movement also causes the shapes of the outer annular chamber 64 and the inner annular chamber 65 to change. In the portion of the container 60 illustrated in FIG. 7, the volume of the inner annular chamber 65 decreases. As mentioned above, the legs 62a divide the inner annular chamber 65 into a plurality of discrete sub-chambers that preferably do not communicate directly with one another. Thus, such relative movement causes some of the fluid 44a contained in the inner annular chamber 65 to flow radially outwardly through the passageway 66 formed through the intermediate annular member (and the control valve 67 provided therein) into the outer annular chamber 64. At the same time, however, on the diametrically opposite portion of the container 60, the volume of the inner annular chamber 65 increases by approximately the same amount. Thus, such relative movement also causes some of the fluid 44a contained in the opposite inner annular chamber 65 to flow radially inwardly through the passageway 66 formed through the intermediate annular member (and the control valve 67 provided therein) from the outer annular chamber 64 into the inner annular chamber 65.

In the same manner as described above, the controller 53 determines the magnitudes of the electromagnetic fields generated by the electromagnetic coils 51 and, thus, varies the ability of the fluid 44a to flow through each of the control valves 67 between the outer annular chamber 64 and the inner annular chamber 65. Thus, the vibration dampening characteristics of the container 60 can be continuously varied as desired.

In accordance with the provisions of the patent statutes, the principle and mode of operation of this invention have been described in its preferred embodiment. However, it should be noted that this invention may be practiced otherwise than as specifically illustrated and described without departing from its spirit or scope.

What is claimed is:

1. A center bearing assembly adapted to support a shaft for rotation relative to a support surface comprising:
   a bearing adapted to support a shaft for rotation;
   a bracket adapted to be supported on a support surface; and
   a supporting structure disposed between said bearing and said bracket, said supporting structure having first and second quantities of a fluid therein and a control valve for selectively controlling the flow of fluid between said first and second quantities of fluid.

2. The center bearing assembly defined in claim 1 wherein said supporting structure includes first and second bladders having said first and second quantities of said fluid therein, and wherein said control valve provides selective fluid communication between said first and second bladders.

3. The center bearing assembly defined in claim 2 wherein said supporting structure includes a plurality of pairs of first and second bladders, each having said first and second quantities of said fluid therein, and wherein a control valve provides selective fluid communication between each of said pairs of said first and second bladders.

4. The center bearing assembly defined in claim 1 wherein said supporting structure includes a container defining first and second chambers having said first and second quantities of said fluid therein, and wherein said control valve provides selective fluid communication between said first and second chambers.

5. The center bearing assembly defined in claim 4 wherein said container includes an outer portion, an intermediate portion, and an inner portion, wherein an outer annular chamber is defined between said outer portion and said intermediate portion and an inner chamber is defined between said intermediate portion and said inner portion, and wherein said control valve provides selective fluid communication between said outer and inner chambers.

6. The center bearing assembly defined in claim 1 wherein said fluid is a rheological fluid, and wherein said control valve generates an energy field for controlling the flow of fluid between said first and second quantities of fluid.

7. The center bearing assembly defined in claim 1 wherein said fluid is a magneto-rheological fluid, and wherein said control valve generates a magnetic energy field for controlling the flow of fluid between said first and second quantities of fluid.

8. The center bearing assembly defined in claim 1 further including a control circuit for operating said control valve to control the flow of fluid between said first and second quantities of fluid.

9. The center bearing assembly defined in claim 8 further including a sensor that generates a signal that is representative of a sensed condition, and wherein said control circuit is responsive to said sensor signal for operating said control valve.

10. The center bearing assembly defined in claim 1 wherein said supporting structure includes an elastomer support member.

11. A center bearing assembly adapted to support a shaft for rotation relative to a support surface comprising:
a bearing adapted to support a shaft for rotation;
a bracket adapted to be supported on a support surface; and
a supporting structure disposed between said bearing and said bracket, said supporting structure including first and second bladders having first and second quantities of a fluid therein and a control valve that provides selective fluid communication between said first and second bladders.

12. The center bearing assembly defined in claim 11 wherein said supporting structure includes a plurality of pairs of first and second bladders, each having said first and second quantities of said fluid therein, and wherein a control valve provides selective fluid communication between each of said pairs of said first and second bladders.

13. The center bearing assembly defined in claim 11 wherein said fluid is a rheological fluid, and wherein said control valve generates an energy field for controlling the flow of fluid between said first and second quantities of fluid.

14. The center bearing assembly defined in claim 11 wherein said fluid is a magneto-rheological fluid, and wherein said control valve generates a magnetic energy field for controlling the flow of fluid between said first and second quantities of fluid.

15. The center bearing assembly defined in claim 11 further including a control circuit for operating said control valve to control the flow of fluid between said first and second quantities of fluid.

16. The center bearing assembly defined in claim 15 further including a sensor that generates a signal that is representative of a sensed condition, and wherein said control circuit is responsive to said sensor signal for operating said control valve.

17. The center bearing assembly defined in claim 11 wherein said supporting structure includes an elastomer support member.

18. A center bearing assembly adapted to support a shaft for rotation relative to a support surface comprising:
a bearing adapted to support a shaft for rotation;
a bracket adapted to be supported on a support surface; and
a supporting structure disposed between said bearing and said bracket, said supporting structure including a container defining first and second chambers having first and second quantities of a fluid therein, wherein said container includes an outer portion, an intermediate portion, and an inner portion, wherein an outer annular chamber is defined between said outer portion and said intermediate portion and an inner chamber is defined between said intermediate portion and said inner portion, and wherein a control valve provides selective fluid communication between said outer and inner chambers.

19. The center bearing assembly defined in claim 18 wherein said fluid is a rheological fluid, and wherein said control valve generates an energy field for controlling the flow of fluid between said first and second quantities of fluid.

20. The center bearing assembly defined in claim 18 wherein said fluid is a magneto-rheological fluid, and wherein said control valve generates a magnetic energy field for controlling the flow of fluid between said first and second quantities of fluid.

21. The center bearing assembly defined in claim 18 further including a control circuit for operating said control valve to control the flow of fluid between said first and second quantities of fluid.

22. The center bearing assembly defined in claim 21 further including a sensor that generates a signal that is representative of a sensed condition, and wherein said control circuit is responsive to said sensor signal for operating said control valve.

23. The center bearing assembly defined in claim 18 wherein said supporting structure includes an elastomer support member.

24. A center bearing assembly adapted to support a shaft for rotation relative to a support surface comprising:
a bearing adapted to support a shaft for rotation;
a bracket adapted to be supported on a support surface; and
a supporting structure disposed between said bearing and said bracket, said supporting structure having first and second quantities of a fluid therein and a control valve for controlling the flow of fluid between said first and second quantities of fluid, wherein said first and second quantities of fluid is one of a rheological fluid or a magneto-rheological fluid.

25. The center bearing assembly defined in claim 24 wherein said supporting structure includes first and second bladders having said first and second quantities of said fluid therein, and wherein said control valve provides selective fluid communication between said first and second bladders.

26. The center bearing assembly defined in claim 24 wherein said supporting structure includes a plurality of pairs of first and second bladders, each having said first and second quantities of said fluid therein, and wherein a control valve provides selective fluid communication between each of said pairs of said first and second bladders.

27. The center bearing assembly defined in claim 24 wherein said supporting structure includes a container defining first and second chambers having said first and second quantities of said fluid therein, and wherein said control valve provides selective fluid communication between said first and second chambers.

28. The center bearing assembly defined in claim 24 wherein said container includes an outer portion, an intermediate portion, and an inner portion, wherein an outer annular chamber is defined between said outer portion and said intermediate portion and an inner chamber is defined between said intermediate portion and said inner portion, and wherein said control valve provides selective fluid communication between said outer and inner chambers.

29. The center bearing assembly defined in claim 24 further including a control circuit for operating said control valve to control the flow of fluid between said first and second quantities of fluid.

30. The center bearing assembly defined in claim 29 further including a sensor that generates a signal that is representative of a sensed condition, and wherein said control circuit is responsive to said sensor signal for operating said control valve.

31. The center bearing assembly defined in claim 24 wherein said supporting structure includes an elastomer support member.

32. A center bearing assembly adapted to support a shaft for rotation relative to a support surface comprising:

a bearing adapted to support a shaft for rotation;

a bracket adapted to be supported on a support surface;

a supporting structure disposed between said bearing and said bracket, said supporting structure having first and second quantities of a fluid therein and a control valve for controlling the flow of fluid between said first and second quantities of fluid; and a control circuit for operating said control valve.

33. The center bearing assembly defined in claim 32 wherein said fluid is a rheological fluid, and wherein said control circuit generates an energy field for controlling the flow of fluid between said first and second quantities of fluid.

34. The center bearing assembly defined in claim 32 wherein said fluid is a magneto-rheological fluid, and wherein said control circuit generates a magnetic energy field for controlling the flow of fluid between said first and second quantities of fluid.

35. The center bearing assembly defined in claim 32 further including a sensor that generates a signal that is representative of a sensed condition, and wherein said control circuit is responsive to said sensor signal for operating said control valve.

36. The center bearing assembly defined in claim 32 wherein said supporting structure includes an elastomer support member.

* * * * *